United States Patent
Czaplewski et al.

(10) Patent No.: US 10,316,172 B2
(45) Date of Patent: Jun. 11, 2019

(54) MULTI-FUNCTION FILLER MATERIALS

(71) Applicant: International Business Machines Corporation, Armonk, NY (US)

(72) Inventors: Sarah K. Czaplewski, Rochester, MN (US); Joseph Kuczynski, North Port, FL (US); Jason T. Wertz, Pleasant Valley, NY (US); Jing Zhang, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/814,049

(22) Filed: Nov. 15, 2017

(65) Prior Publication Data

US 2018/0072871 A1    Mar. 15, 2018

Related U.S. Application Data

(63) Continuation of application No. 15/064,894, filed on Mar. 9, 2016, now Pat. No. 9,879,128.

(51) Int. Cl.
| | |
|---|---|
| *C08K 9/06* | (2006.01) |
| *B29C 45/00* | (2006.01) |
| *B29C 45/40* | (2006.01) |
| *B29C 70/64* | (2006.01) |
| *B29K 105/16* | (2006.01) |
| *B29K 509/02* | (2006.01) |

(52) U.S. Cl.
CPC ............ *C08K 9/06* (2013.01); *B29C 45/0001* (2013.01); *B29C 45/40* (2013.01); *B29C 70/64* (2013.01); *B29K 2105/16* (2013.01); *B29K 2509/02* (2013.01); *B29K 2905/00* (2013.01)

(58) Field of Classification Search
CPC ... C08K 3/36; C07F 7/10; C07F 7/182; C08F 230/08
See application file for complete search history.

(56) References Cited

U.S. PATENT DOCUMENTS

| | | | |
|---|---|---|---|
| 3,626,043 A | 12/1971 | Flipot et al. | |
| 6,139,322 A | 10/2000 | Liu | |
| 6,878,776 B1 | 4/2005 | Pascault et al. | |
| 9,121,276 B2 | 9/2015 | Heidecker et al. | |
| 2010/0317039 A1 | 12/2010 | Salk et al. | |
| 2014/0309343 A1* | 10/2014 | Venema | B01J 2/00 524/71 |
| 2015/0143782 A1 | 5/2015 | Shah et al. | |
| 2015/0337183 A1 | 11/2015 | Pratte et al. | |
| 2017/0260370 A1 | 9/2017 | Czaplewski et al. | |

FOREIGN PATENT DOCUMENTS

| | | |
|---|---|---|
| TW | 302380 B | 4/1997 |
| WO | 2009109705 A1 | 9/2009 |
| WO | 2010138546 A1 | 12/2010 |

OTHER PUBLICATIONS

List of IBM Patents or Applications Treated As Related.
(Continued)

*Primary Examiner* — Kuo Liang Peng
(74) *Attorney, Agent, or Firm* — Patterson + Sheridan, LLP (57) ABSTRACT

A composition of matter includes a particle, a resin bonding functionality bonded to a first portion of the particle, and a lubricating functionality bonded to a second portion of the particle.

18 Claims, 5 Drawing Sheets

(56) References Cited

OTHER PUBLICATIONS

Horikoshi, Microwaves in Nanoparticle Synthesis, First Edition. Edited by Satoshi and Nick Serpone, (2013).
Fulmer, M., "Introduction to Lubricants and Additives for Polymer Compounds", Oct. 24, 2000, 19 pp.
Perro, et al., "Production of Large Quantities of "Janus" Nanoparticles Using Wax-in-Water Emulsions", Colloids and Surfaces—A Physicochemical and Engineering Aspects, Jan. 2009, vol. 332., 2 pp.
Stober, et al., "Controlled Growth of Monodisperse Silica Spheres in the Micron Size Range", Journal of Colloid and Interface Science, Jan. 1968, vol. 26, 8 pp.

* cited by examiner

MULTI-FUNCTION FILLER MATERIALS

I. CROSS-REFERENCE TO RELATED APPLICATIONS

This application is a continuation of co-pending U.S. patent application Ser. No. 15/064,894, filed Mar. 9, 2016. The aforementioned related patent application is herein incorporated by reference in its entirety.

I. FIELD OF THE DISCLOSURE

The present disclosure relates generally to multiple-function filler materials.

II. BACKGROUND

In molding and making polymers, lubricants and additives are important to the final product being produced. It is common for polymers to contain additives, such as adhesives, surfactants, and filler materials. Lubricants are used to decrease frictional forces between materials, such as polymer:polymer friction, polymer:filler friction, filler:filler friction, and filler:metal friction. In injection molding, the lubricants are typically applied to the mold itself as a mold release to prevent the polymer from sticking to the metal surface.

III. SUMMARY OF THE DISCLOSURE

According to an embodiment, a composition of matter includes a particle, a resin bonding functionality bonded to a first portion of the particle, and a lubricating functionality bonded to a second portion of the particle.

According to another embodiment, a process of forming a multiple-function filler material for a polymeric application is disclosed. The process includes bonding a first set of functional groups to a first portion of a particle. The process also includes bonding a second set of functional groups to a second portion of the particle.

According to another embodiment, an injection molding process is disclosed. The injection molding process includes blending a multiple-function filler material into a polymeric resin to form a polymeric blend. The multiple-function filler material includes a particle, resin bonding functional groups on a first portion of the particle, and lubricating functional groups on a second portion of the particle. The injection molding process also includes performing an injection molding operation that includes injecting the polymeric blend into an injection mold to form a polymeric material.

Features and other benefits that characterize embodiments are set forth in the claims annexed hereto and forming a further part hereof. However, for a better understanding of the embodiments, and of the advantages and objectives attained through their use, reference should be made to the Drawings and to the accompanying descriptive matter.

V. DETAILED DESCRIPTION

The present disclosure relates to multiple-function filler materials for polymeric applications and processes for forming the multiple-function filler materials. The multiple-function filler materials of the present disclosure may act not only as a filler material (for rheology control, mechanical improvement, etc.) but also as an internal lubricant. In the present disclosure, a particle having two functionalities is compounded as a filler material within the polymer to be molded. The functionalized particle has a functionality on one side that will bond with the polymer and act as a rheology control agent, mechanical property improver, etc. The other side of the functionalized particle has a functionality that acts as a lubricating feature to prevent the polymer from sticking to metal surfaces during molding. The particles serve multiple purposes when added to the polymer, decreasing the number of additional steps that are required to prepare a mold for making polymeric parts or potentially eliminating the need for an external mold release agent. Additionally, bonding the particles to the polymer matrix may improve the mechanical properties of the polymer.

Figure 1:
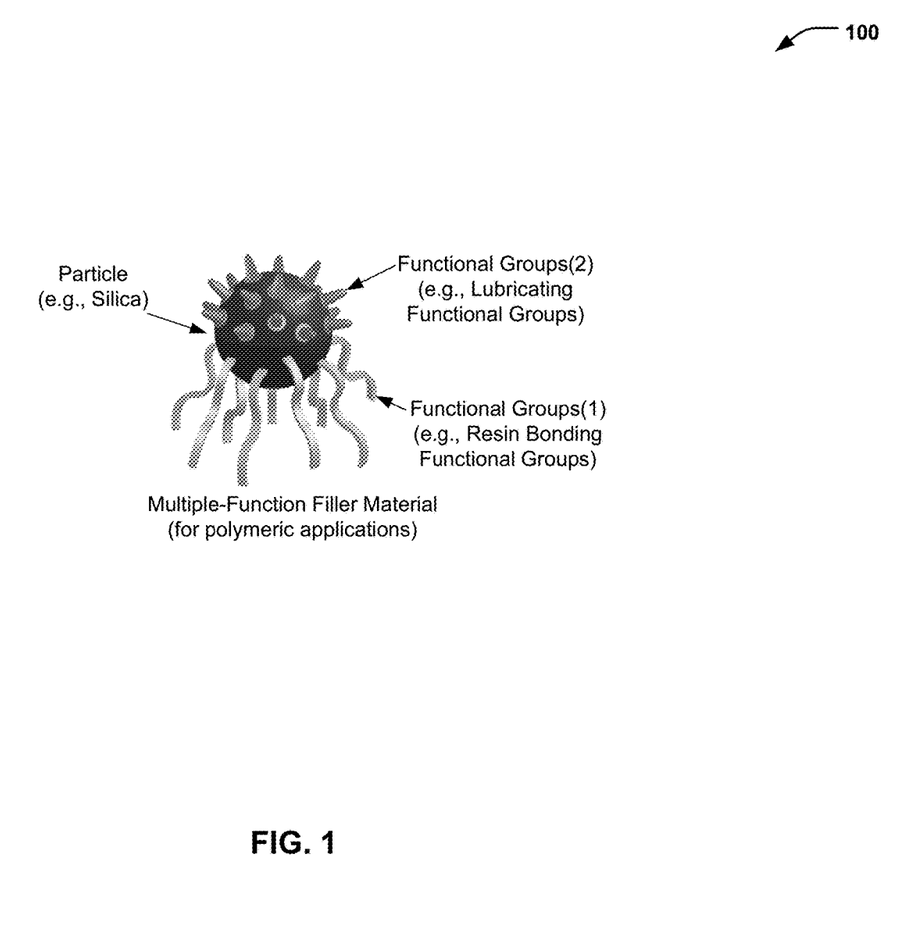
FIG. 1 is a diagram showing a multiple-function filler material that includes a particle, resin bonding functional groups bonded to a first portion of the particle, and lubricating functional groups bonded to a second portion of the particle, according to one embodiment.

FIG. 1 is a diagram 100 showing a composition of matter (referred to herein as a "multiple-function filler material") that includes a first set of functional groups bonded to a first portion of a particle (e.g., a silica particle) and a second set of functional groups bonded to a second portion of the particle. In the particular embodiment depicted in FIG. 1, an unsaturated functionality is attached to one side of the particle for bonding to a polymeric matrix. On the other side of the particle is a lubricating moiety that acts as a mold release to prevent the particles from sticking to a metal injection mold during formation. As described further herein, the multiple-function filler material of FIG. 1 may enable the elimination of processing steps associated with preparing the molds and may promote adhesion to the polymeric matrix, which may improve the materials properties of the final part.

In the particular embodiment illustrated in FIG. 1, the first set of functional groups (identified as "Functional Groups (1)" in FIG. 1) includes resin bonding functional groups, and the second set of functional groups (identified as "Functional Groups(2)" in FIG. 1) includes lubricating functional groups. As described further herein with respect to FIGS. 2-4, the multiple-function filler material of FIG. 1 may be formed by attaching the resin bonding functional groups to an exposed surface of a silica particle and subsequently attaching the lubricating functional groups to another surface of the silica particle. In alternative embodiments, the lubricating functional groups may be applied prior to the application of the resin bonding functional groups.

In a particular embodiment, the particle has a characteristic dimension (e.g., an average diameter) in a range of about 100 nanometers to about 1 micrometer. As described further herein with respect to FIG. 2, the particle may include a silica particle that is prepared through a modified Stöber et al. synthesis (among other alternative processes). As illustrated and described further herein with respect to FIG. 2, a first portion of the particle is exposed in order to allow the resin bonding functional groups to be bonded to the first portion of the particle, while a second portion of the particle may be encapsulated within a wax (or other material). As illustrated and described further herein with respect to FIG. 3, after bonding the resin bonding functional groups to the first portion of the particle, the wax (or other material) may be removed in order to expose the second portion of the particle. As illustrated and described further herein with respect to FIG. 4, exposure of the second portion of the particle allows the lubricating functional groups to be bonded to the second portion of particle.

Thus, FIG. 1 illustrates an example of a multiple-function filler material that includes resin bonding functional groups bonded to a first portion of a particle and lubricating functional groups bonded to a second portion of the particle. As described further herein, the multiple-function filler material of FIG. 1 may be used in polymeric applications, such as injection molding of polymeric resins. The resin bonding functional groups may be selected to enable bonding of the multiple-function filler material to a polymeric resin (e.g., vinyl functional groups for polymeric resins that include similar unsaturated moieties). In some cases, the lubricating functional groups may enable injection molding operations to be performed without additional processing steps associated with adding a lubricating release layer to an injection mold (e.g., a metal mold) prior to performing an injection molding operation. Additionally, the multiple-function filler material of FIG. 1 may provide rheological control and/or improve mechanical properties of an injected molded polymeric material.

Figure 2:
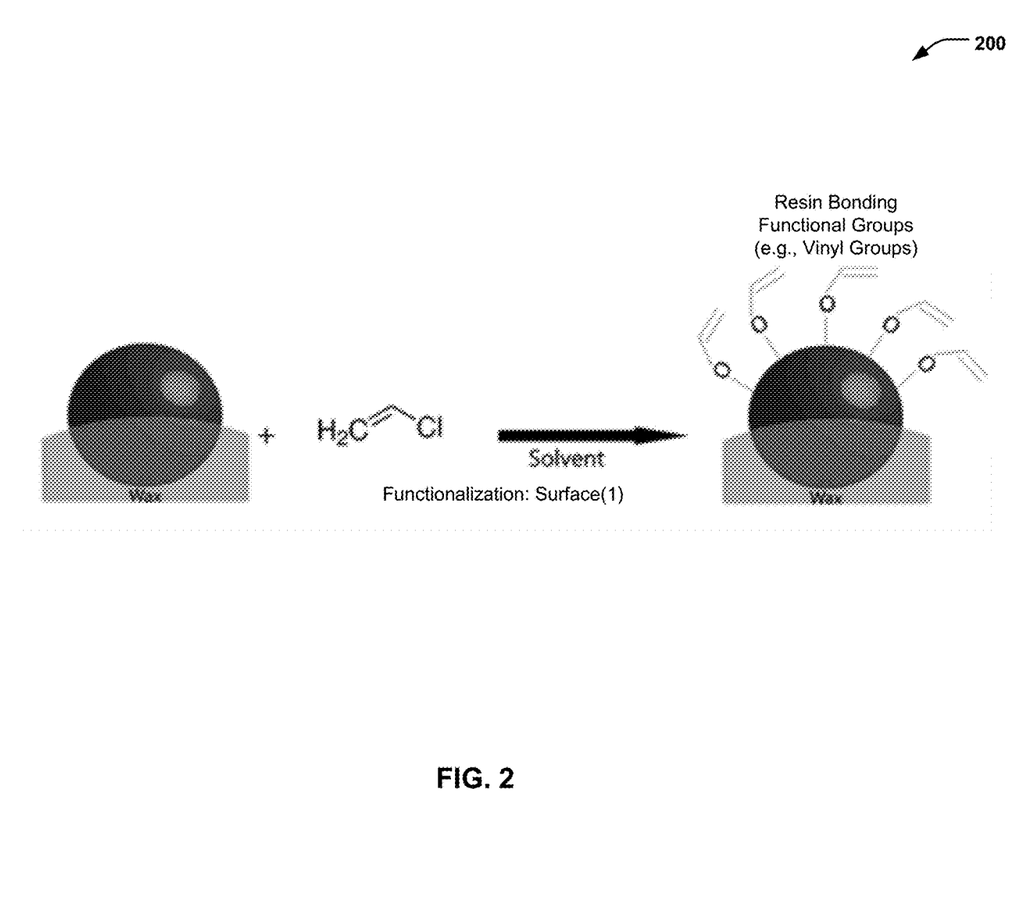
FIG. 2 is a diagram showing the addition of a first set of functional groups to a first portion of a particle, according to one embodiment.

FIG. 2 is a diagram 200 showing the addition of a first set of functional groups (e.g., resin bonding functional groups) to a first portion of a (silica) particle, according to one embodiment. In order to produce "Janus" particles (as described further herein), the particles are first modified to protect a portion (referred to as the "second portion" herein) of a surface of the particle. In a particular embodiment, such "Janus" particles may be produced using a wax emulsion technique (e.g., using a paraffin wax). In FIG. 2, the first portion of the particle is exposed while a second portion of the particle is encapsulated (e.g., in paraffin wax). As illustrated and further described herein with respect to FIG. 3, after the first set of functional groups have been attached to the first portion of the particle, the wax encapsulant may be removed to expose the second portion of the particle. As illustrated and further described herein with respect to FIG. 4, the second set of functional groups (e.g., lubricating functional groups) may attached to the second portion of the particle to form a multiple-function filler material (e.g., the multiple-function filler material of FIG. 1).

In the example of FIG. 2, the first set of functional groups to be attached to the particle include resin bonding functional groups (e.g., vinyl groups). As illustrated and further described herein with respect to the examples of FIGS. 3-4, the second set of functional groups to be attached to the particle include lubricating functional groups. In other cases, the first set of functional groups to be attached to the particle may include the lubricating functional groups, and the second set of functional groups to be attached to the particle may include the resin bonding functional groups. Additionally, while FIG. 2 illustrates an example of the addition of vinyl functional groups to a silica particle, one of ordinary skill in the art will appreciate that alternative functional groups and/or particles may be utilized. Illustrative, non-limiting examples of alternative resin bonding moieties may include amines, epoxies, allyls, or acrylates that may be selected for a particular polymeric resin type that the multiple-function filler material is to be bonded to prior to an injection molding operation.

In a particular embodiment, silica particles may be produced through a modified Stöber synthesis. Utilizing a silica precursor (e.g., tetraethoxysilane (TEOS)), ammonia, water, and a solvent may enable production of particles that have diameters in the nanometer size range up to the micron size range. By varying the water concentration in the synthesis, the particle's diameter can be varied. After synthesis, particles may be removed from their mother liquor solution to halt the growth of the particles and to obtain the desired particle size. Through the process of centrifugation and solvent washes, particles may be removed from residual catalyst and precursor monomer. Particles may then be removed from solution in vacuo for further processing.

PROPHETIC EXAMPLE

Synthesis of Silica Particles

Particles may be prepared through a modified Stöber et al. synthesis using anhydrous ethanol (200 proof), ammonia (2M), deionized water, and tetraethoxysilane (TEOS). TEOS may be distilled prior to use. Ethanol (5.38 mL) and TEOS (0.38 mL) may be added to a 20 mL scintillation vial and shaken to mix. In a separate vial, 2M ammonia (3.75 mL) and deionized water (0.49 mL) may be added and shaken to mix. The ammonia solution may then be poured into the ethanol/TEOS solution and left to stir for about 24 hours. After a suitable reaction period, particles may be centrifuged and rinsed with ethanol multiple times (e.g., at least 3 times) to remove residual monomer, yielding silica nanoparticles. The final molar ratio of TEOS:ammonia:water may be 1.00:4.39:15.95. The silica nanoparticles may have a characteristic dimension (e.g., an average diameter) of about 200 nanometers.

To form "Janus" particles, the silica particles may be modified to protect a portion (referred to as the "second portion" herein) of a surface of the particle. In preparation of such particles, an emulsion may be fabricated. Silica particles may then be dispersed in an ethanol/water solution at an elevated temperature (to melt the wax that will be added later) and then mixed. The particle mixture may be mixed with cetyl trimethylammonium bromide (CTAB) to partially hydrophobize the surface of the particle. A low concentration of CTAB may be used in order to avoid the creation of a bilayer at the surface of the particle. The CTAB may cause the particle to favor the adsorption at the oil-water interface. Paraffin wax may then be added to the particle suspension, and the mixture may be vigorously stirred at elevated temperature. After cooling (e.g., to room temperature), the paraffin wax may solidify into solid droplets with the nanoparticles partially extending from the surface of the droplets (as shown on the left side of FIG. 2). The droplets (with particles extending from the surface) may then be washed with an acid to remove CTAB and to expose a "bare" silica particle surface.

As shown on the right side of FIG. 2, the first portion of the silica particle may be functionalized to include the resin bonding functional groups (e.g., vinyl functional groups). In a particular embodiment, the colloidosomes (e.g., the wax droplets having the silica particles partially embedded) may be reacted with a vinyl chloride solution to yield particles having resin bonding chemistries (vinyl functional groups).

Illustrative, non-limiting examples of alternative functionalities for bonding to resins may include amines, epoxies, allyls, or acrylates.

PROPHETIC EXAMPLE

Silica Particle Functionalization with Resin Bonding Functional Groups

Silica particles with vinyl groups ("resin bonding functional groups") may be prepared using a modified Perro et al. paraffin-in-water emulsion. Silica particles may be dispersed in an ethanol/water (6.7%, w/w) solution and heated to 65° C. To the suspension, cetyl trimethylammonium bromide (CTAB; $C_{CTAB}/S_{Silica}=5\times10^{-6}$ mol $L^{-1}m^{-2}$-$S_{Silica}$) may be added. Paraffin wax (1.0 g, CAS no. 8002-74-2) may be added to the suspension. Once the wax has melted, the mixture may be vigorously stirred (9000 rpm) for 80 seconds to form an emulsion. The emulsion may be allowed to cool to room temperature to form solid droplets of paraffin wax with embedded silica particles. The paraffin wax droplets may be filtered and dispersed into toluene (20 mL) and stirred. Vinyl chloride (0.1 to 10 weight percent) may be added, and the mixture may be heated to about 35° C. The mixture may be allowed to react for about 48 h followed by filtration and washing of the paraffin wax droplets with ethanol. Finally, the paraffin wax droplets may be dissolved in dichloromethane (DCM) to yield vinyl-modified silica particles.

Thus, FIG. 2 illustrates an example of the addition of a first set of functional groups to a first portion of a particle. In the example of FIG. 2, the first set of functional groups include resin bonding functional groups (e.g., vinyl groups) to enable bonding to a polymeric resin prior to an injection molding operation. As illustrated and further described herein with respect to FIGS. 3-4, after the first set of functional groups have been attached to the particle, a second portion of the particle may be exposed to attach lubricating functional groups that may enable the injection molding operation to be performed without the addition of a separate lubricating release layer.

Figure 3:
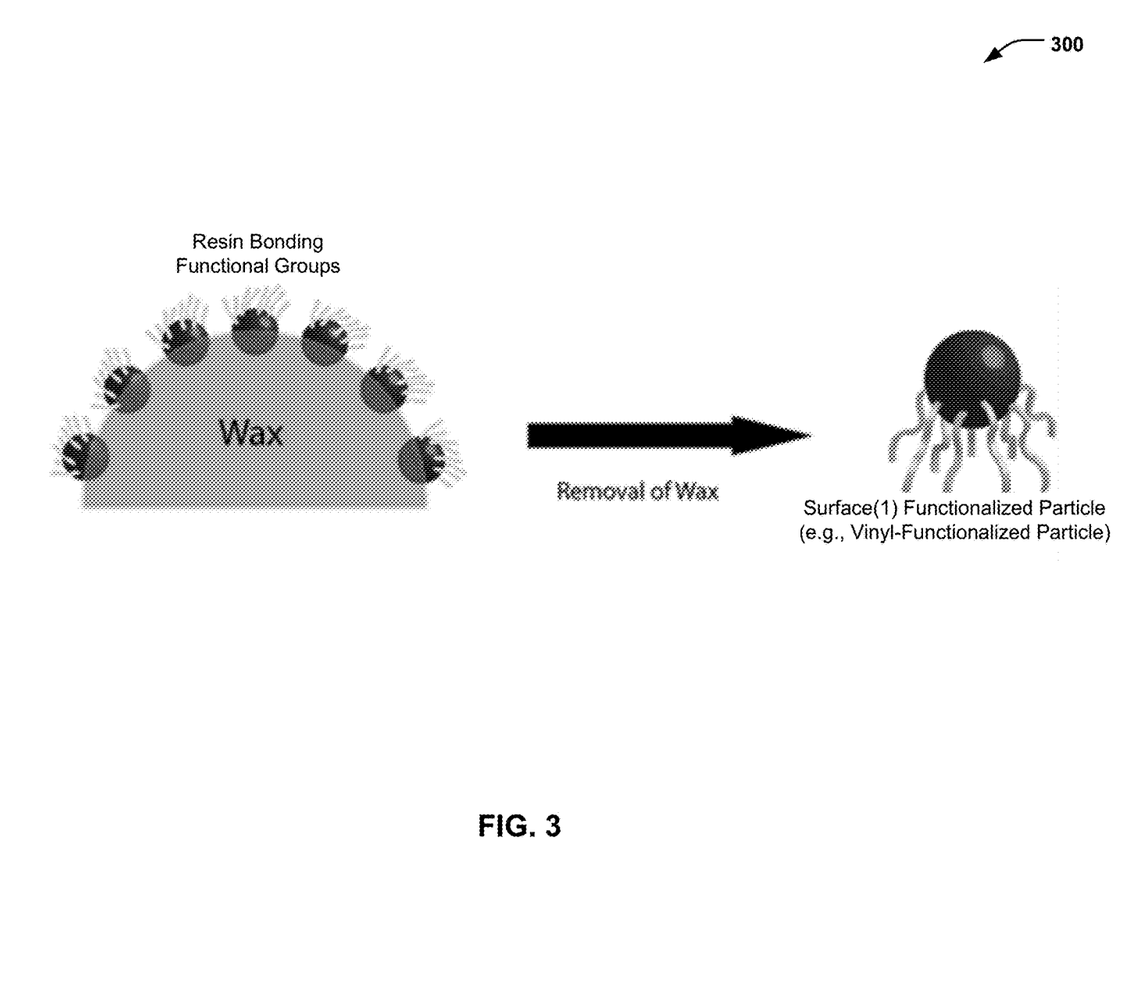
FIG. 3 is a diagram showing the removal of an encapsulant material to expose a second portion of the particle, according to one embodiment.

Referring to FIG. 3, a diagram 300 illustrates the removal of the vinyl-functionalized particle of FIG. 2 from the encapsulating wax to expose the second surface of the particle. As illustrated and further described herein with respect to FIG. 4, the second set of functional groups (e.g., lubricating functional groups) may be attached to the exposed second portion of the particle to form a multiple-function filler material (e.g., the multiple-function filler material of FIG. 1).

FIG. 3 illustrates that, after addition of the first set of functional groups as shown in FIG. 2, the partially functionalized particles (vinyl-functionalized particles in the example of FIG. 2) may be removed from the wax encapsulant to yield the "Janus" type particles. A hydrocarbon solvent, such as benzene, may be used to dissolve the wax. The particles may be centrifuged and decanted numerous times to yield the partially functionalized particles free of wax (as shown on the right side of FIG. 3).

Figure 4:
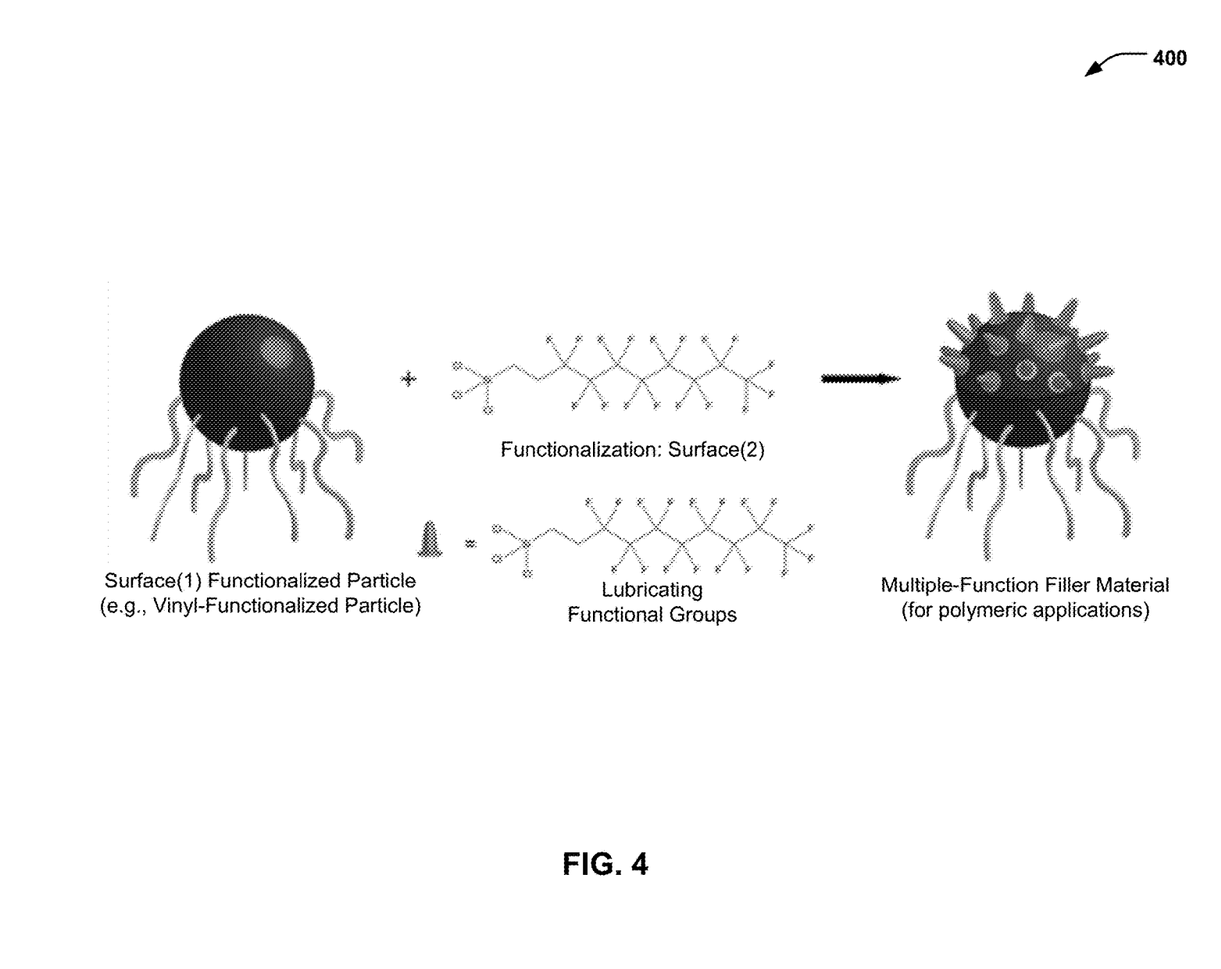
FIG. 4 is a diagram showing the addition of a second set of functional groups to the second portion of the particle, according to one embodiment.

FIG. 4 is a diagram 400 showing the addition of a second set of functional groups (e.g., lubricating functional groups) to a second portion of the (silica) particle, according to one embodiment. FIG. 4 illustrates that the addition of the second set of functional groups to the second portion of the particle results in a material that may provide multiple functionalities when used as a filler material in polymeric applications. The resin bonding functional groups attached to the first portion of the particle (e.g., vinyl groups) enable bonding to a polymeric resin prior to an injection molding operation, and the lubricating functional groups may enable the injection molding operation to be performed without the addition of a separate lubricating release layer.

FIG. 4 illustrates that functionalization may include reacting a silane material including multiple fluorine groups with the exposed portion of the particle to render the exposed surface lubricious. In the particular embodiment illustrated in FIG. 4, the silane material includes trichloro(3,3,4,4,5,5,6,6,7,7,8,8,9,9,10,10,10-heptadecafluorodecyl)silane. In other embodiments, alternative and/or additional materials may be selected to provide sufficient lubricating characteristics for a particular injection molding operation.

The resulting multiple-function filler material may be blended into polymeric matrices having the same unsaturated functionality as that of the particles. The particles, when blended, are allowed to react with the polymer and form a bond to "lock" the particle in place with the polymer. If additional rheology control is required, additional materials may be added. The resulting particle having an abundant amount of fluorine groups may remove the need for additional lubricants during the molding process. The lubricity of the polymer can be tailored by changing the "Janus" particle filler content and/or varying the number of lubricating functional groups (e.g., fluorine groups in the example silane material of FIG. 4). In a particular embodiment, a weight percentage of the multiple-function filler material that is added to the polymeric resin may be in a range of 10 to 40 weight percent, such as in a range of 10 to 30 weight percent, or in a range of 10 to 20 weight percent.

PROPHETIC EXAMPLE

Silica Particle Surface Modification with Lubricating Functional Groups

To a round-bottom flask, toluene (20 mL) may be added and stirred (e.g., with a magnetic stir bar), and 1 g of vinyl-modified "Janus" silica particles may be added, followed by the dropwise addition of trichloro(3,3,4,4,5,5,6,6,7,7,8,8,9,9,10,10,10-heptadecafluorodecyl)silane (0-10 wt %) to the mixture. The mixture may then be allowed to react for about 24 h at about 35° C. After reaction, the mixture may be cooled to room temperature and then filtered and washed with ethanol several times to remove excess silane. The final product may then be dried in vacuo.

Figure 5:
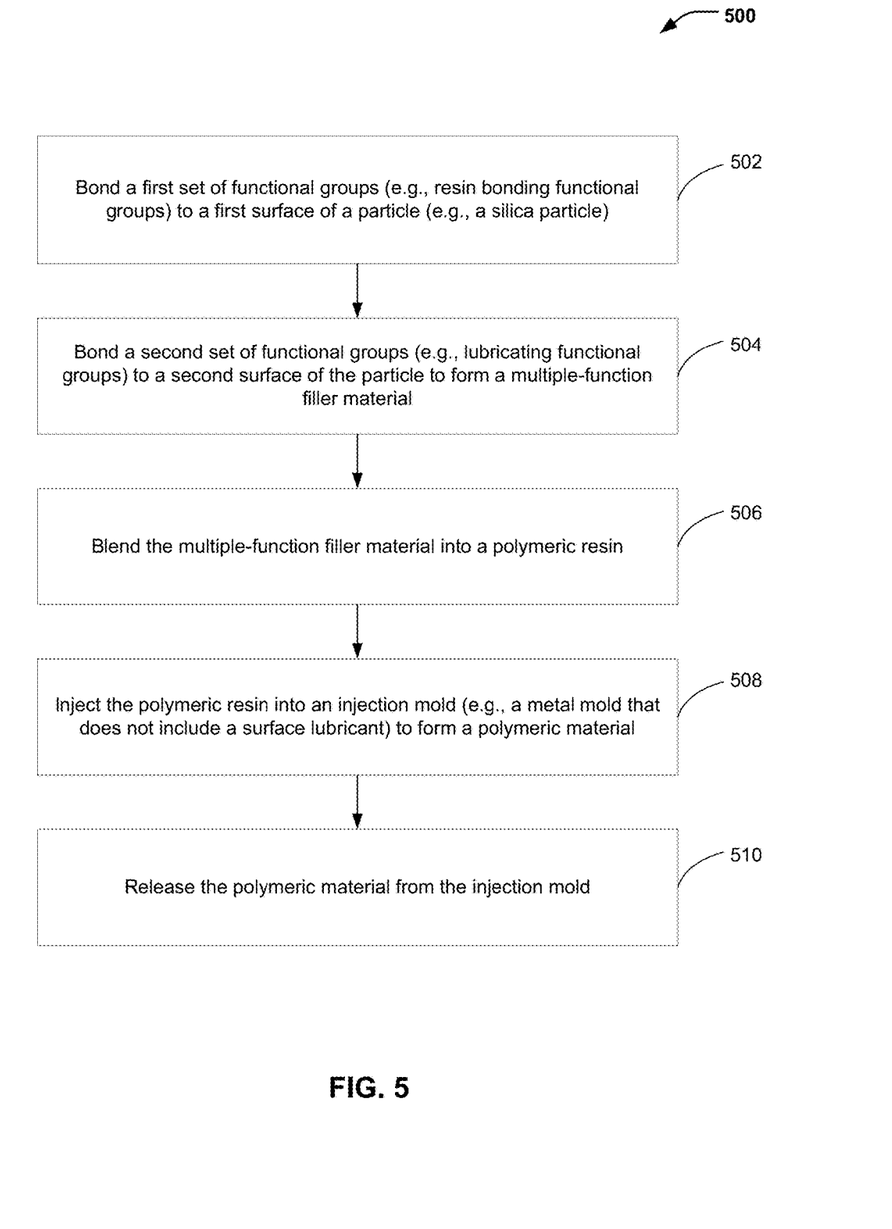
FIG. 5 is a flow diagram showing a particular embodiment of a process of forming an injection molded polymeric material using the multiple-function filler materials described herein.

FIG. 5 is a flow diagram that illustrates a particular embodiment of a process 500 of forming a multiple-function filler material. In the particular embodiment illustrated in FIG. 5, the process 500 includes blending the multiple-function filler material into a polymeric resin prior to an injection molding operation. Resin bonding functional groups provide the function of bonding the particle to a polymeric matrix, and lubricating functional groups provide the function of enabling release of a polymeric material from an injection mold. In a particular embodiment, the multiple-function filler material may be formed according to the process described herein with respect to FIGS. 2-4.

In the particular embodiment illustrated in FIG. 5, operations associated with an example process of producing a multiple-function filler material are identified as operations 502-504, operations associated with blending the multiple-function filler material into a polymeric resin are identified as operation 506, and operations associated with forming an injected molded polymeric material are identified as operations 508-510. It will be appreciated that the operations shown in FIG. 5 are for illustrative purposes only and that the operations may be performed in alternative orders, at alternative times, by a single entity or by multiple entities, or a combination thereof.

The process 500 includes bonding a first set of functional groups to a first surface of a particle (e.g., a silica particle), at 502. In some cases, the first set of functional groups to be applied to the particle include resin bonding functional groups, and a second set of functional groups to be applied to the particle include lubricating functional groups. For example, as illustrated and further described herein with respect to FIG. 2, resin bonding functional groups (e.g., vinyl groups) may be applied to an exposed surface of the particle to form a vinyl-functionalized particle. As illustrated and further described herein with respect to FIG. 3, after functionalization of the first surface of the particle with the first set of functional groups, the particle may be removed from the wax encapsulant to expose a second surface of the particle for subsequent functionalization.

The process 500 includes bonding a second set of functional groups to a second surface of the particle to form a multiple-function filler material, at 504. When the first set of functional groups bonded to the particle (at 502) include resin bonding functional groups, the second set of functional groups include lubricating functional groups. For example, referring to FIG. 4, the lubricating functional groups may be bonded to a second surface of the vinyl-functionalized particle to form the multiple-functional filler material. In alternative embodiments, while not shown in the examples depicted in FIGS. 2-4, the first set of functional groups applied to the particle (at 502) may include lubricating functional groups, and the second set of functional groups applied to the particle (at 504) may include resin bonding functional groups.

In the particular embodiment illustrated in FIG. 5, the process 500 also includes blending the multiple-function filler material into a polymeric resin, at 506. For example, the multiple-function filler material formed according to the process described herein with respect to FIGS. 2-4 includes vinyl functional groups for binding the silica particle to a polymeric resin that includes similar unsaturated functional groups. In alternative embodiments where the resin bonding functional groups correspond to alternative moieties (e.g., amines, epoxies, allyls, acrylates, etc.), the silica particle may be bound to a polymeric resin that includes similar moieties.

In the particular embodiment illustrated in FIG. 5, the process 500 further includes injecting the polymeric resin into an injection mold, at 508, and releasing the polymeric material from the injection mold, at 510. In some cases, the injection mold may include a metal mold that has not been surface-modified to include a separate lubricant release layer. The lubricating functional groups of the multiple-function filler material of the present disclosure may enable a polymeric material to be removed from the injection mold (e.g., a metal mold) without the additional processing step of applying a lubricant (e.g., a polytetrafluoroethylene (PTFE) spray) to the metal mold prior to injection molding.

Thus, FIG. 5 illustrates an example of a process of forming a multiple-function filler material, blending the multiple-function filler material into a polymeric resin, and forming an injected molded plastic material by injecting the polymeric resin into an injection mold. The resin bonding functional groups enable bonding of a particle (e.g., a silica filler particle for rheological control, etc.) to the polymer prior to injection molding, and the lubricating functional groups enable a formed material to be removed from an injection mold without the need to add a separate lubricating release layer to the injection mold prior to the injection molding operation.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. A composition of matter comprising:
   a particle;
   a resin bonding functionality bonded to a first portion of the particle;
   a lubricating functionality bonded to a second portion of the particle; and
   a polymeric resin bonded to the resin bonding functionality, wherein a ratio of particle to polymeric resin is in the range of 10:1 to 2.5:1, based on weight percent.

2. The composition of matter of claim 1, wherein the particle includes a silica particle.

3. The composition of matter of claim 2, wherein the silica particle has a characteristic dimension in a range of about 100 nanometers to about 1 micrometer.

4. The composition of matter of claim 1, wherein the resin bonding functionality includes vinyl groups.

5. The composition of matter of claim 1, wherein the resin bonding functionality includes amine groups, epoxy groups, allyl groups, or acrylate groups.

6. The composition of matter of claim 1, wherein the lubricating functionality includes fluorine groups.

7. The composition of matter of claim 1, wherein the lubricating functionality includes one or more silane groups.

8. The composition of matter of claim 1, wherein the lubricating functionality includes trichloro(3,3,4,4,5,5,6,6,7,7,8,8,9,9,10,10,10-heptadecafluorodecyl)silane.

9. A composition of matter comprising:
   a silica particle;
   a resin bonding functionality bonded to a first portion of the particle;
   a lubricating functionality comprising one or more fluorine groups bonded to a second portion of the particle; and
   a polymeric resin bonded to the resin bonding functionality, wherein a ratio of particle to polymeric resin is in the range of 10:1 to 2.5:1, based on weight percent.

10. The composition of matter of claim 9, wherein the silica particle has a characteristic dimension in a range of about 100 nanometers to about 1 micrometer.

11. The composition of matter of claim 9, wherein the resin bonding functionality includes vinyl groups.

12. The composition of matter of claim 9, wherein the resin bonding functionality includes amine groups, epoxy groups, allyl groups, or acrylate groups.

13. The composition of matter of claim 9, wherein the lubricating functionality includes one or more silane groups.

14. The composition of matter of claim 9, wherein the lubricating functionality includes trichloro(3,3,4,4,5,5,6,6,7,7,8,8,9,9,10,10,10-heptadecafluorodecyl)silane.

15. A composition of matter comprising:
    a silica particle;

a resin bonding functionality comprising vinyl groups, amine groups, epoxy groups, allyl groups, or acrylate groups bonded to a first portion of the particle;

a lubricating functionality comprising one or more fluorine groups bonded to a second portion of the particle; and a polymeric resin bonded to the resin bonding functionality, wherein a ratio of particle to polymeric resin is in the range of 10:1 to 2.5:1, based on weight percent.

16. The composition of matter of claim 15, wherein the silica particle has a characteristic dimension in a range of about 100 nanometers to about 1 micrometer.

17. The composition of matter of claim 15, wherein the lubricating functionality includes one or more silane groups.

18. The composition of matter of claim 15, wherein the lubricating functionality includes trichloro(3,3,4,4,5,5,6,6,7,7,8,8,9,9,10,10,10-heptadecafluorodecyl)silane.

* * * * *